US007440766B1

(12) United States Patent
Tuovinen et al.

(10) Patent No.: US 7,440,766 B1
(45) Date of Patent: Oct. 21, 2008

(54) METHOD FOR EMPLOYING MULTIPATH PROPAGATION IN WIRELESS RADIO COMMUNICATIONS

(75) Inventors: Jussi Tuovinen, Espoo (FI); William Forsyth, Honolulu, HI (US); Wayne Shiroma, Honolulu, HI (US)

(73) Assignee: University of Hawaii, Honolulu, HI (US)

( * ) Notice: Subject to any disclaimer, the term of this patent is extended or adjusted under 35 U.S.C. 154(b) by 720 days.

(21) Appl. No.: 11/144,973

(22) Filed: Jun. 3, 2005

Related U.S. Application Data

(60) Provisional application No. 60/577,776, filed on Jun. 7, 2004.

(51) Int. Cl.
*H04Q 7/20* (2006.01)

(52) U.S. Cl. ....................... 455/506; 455/504; 455/501; 455/500; 455/67.16; 455/67.15; 343/702; 343/703; 342/370; 342/368

(58) Field of Classification Search ................. 455/506, 455/504, 501, 500, 67.11, 63.1, 63.4, 65, 455/67.15, 67.16, 423-425, 422.1, 403, 426.1, 455/426.2, 550.1, 561, 562.1; 343/702, 703, 343/878, 907; 342/370, 368
See application file for complete search history.

(56) References Cited

U.S. PATENT DOCUMENTS

| | | | | |
|---|---|---|---|---|
| 4,985,707 | A * | 1/1991 | Schmidt et al. | 342/370 |
| 5,064,140 | A | 11/1991 | Pittman | |
| 5,781,845 | A | 7/1998 | Dybdal | |
| 6,415,163 | B1 * | 7/2002 | Keskitalo et al. | 455/562.1 |
| 2002/0172269 | A1 * | 11/2002 | Xu | 375/211 |

* cited by examiner

*Primary Examiner*—Keith T Ferguson
(74) *Attorney, Agent, or Firm*—Leighton K. Chong

(57) ABSTRACT

A method of employing multipath propagation in wireless radio communications uses an omnidirectional transmitting/receiving antenna at one end of a transmission link to send an interrogating signal across an environment subject to multipath disturbances to a phase-conjugating retrodirective antenna, and the retrodirective antenna returns a communication signal along the multiple pathways taken by the interrogating signal to the omnidirectional antenna despite the multipath disturbances. In a simplex communication mode, the retrodirective antenna sends a return signal mixed with a communication signal to the omnidirectional antenna. In a duplex communication mode, both an omnidirectional antenna and a phase-conjugating retrodirective antenna are operated in tandem at each end of the transmission link to provide effective two-way wireless radio transmissions.

6 Claims, 4 Drawing Sheets

METHOD FOR EMPLOYING MULTIPATH PROPAGATION IN WIRELESS RADIO COMMUNICATIONS

This U.S. patent application claims the priority of U.S. Provisional Application No. 60/577,776 filed on Jun. 7, 2004, of the same title and by the same inventors.

The subject matter herein was developed in part under a research contract provided by the U.S. Government, National Science Foundation (NSF), Grant No. ECS-9979296. The U.S. Government retains certain rights in the invention.

TECHNICAL FIELD

This invention generally relates to wireless radio frequency or microwave communications, and more particularly, to a method for employing multipath propagation to enhance wireless radio communications.

BACKGROUND OF INVENTION

Wireless radio frequency or microwave communications are used in an increasing number of applications. In addition to current and well-known applications such as mobile phones, wireless communications systems are foreseen to connect practically all items used in homes and offices. Applications such as wireless local area networks (WLAN) and Bluetooth™ are widely used, as well as radio frequency or microwave transmission links across large distances. One of the challenges in such applications is mitigating the fading of the wireless transmission signal due to multipath propagation caused by obstructions and disturbances in the transmission environment. Multipath propagation can be reduced by using antennas with tightly focused beams, signal processing, or special modulation schemes. While high-gain antennas with focused beams are useful for fixed point-to-point communications, mobile and general-purpose communication applications require antennas with wide beams or capabilities for smart beam steering. However, smart beam-steering antennas are usually complex as they require controlling electronics and computational power.

All of the conventional methods described above are employed to reduce the effects of multipath propagation but impose added costs or tradeoffs in the performance or usability of the system. It would be desirable to provide a solution that could enhance communications in severe multipath environments without imposing added costs or losses in performance.

SUMMARY OF INVENTION

In accordance with the present invention, a method of employing multipath propagation in wireless radio communications to reduce the negative effects of multipath fading involves: (1) an omnidirectional transmit/receive antenna at one end of a transmission link which sends an interrogating signal across an environment subject to multipath disturbances to a phase-conjugating retrodirective antenna at the other end of the transmission link, and (2) operating the phase-conjugating retrodirective antenna in a cooperative transmission mode by returning a communication signal along the multiple pathways taken by the interrogating signal to be received by the omnidirectional antenna across the transmission environment despite the multipath disturbances. This is due to the fact that the returning signals (rays) will add coherently.

In a simplex communication mode, the omnidirectional antenna provides an interrogating signal which is transmitted in multipath propagation over multiple pathways through the transmission environment to the retrodirective antenna, and the retrodirective antenna sends a return signal mixed with a communication signal in multiple signal components directed along respective ones of the multiple pathways taken by the interrogating signal to be received by the omnidirectional antenna. The multiple signal components are received additively so as to produce an effective reception signal. In a duplex communication mode, both an omnidirectional antenna and a phase-conjugating retrodirective antenna are operated in tandem at each end of the transmission link to provide effective two-way wireless radio transmissions through the transmission environment despite any multipath disturbances.

Other objects, features, and advantages of the present invention will be explained in the following detailed description of the invention having reference to the appended drawings.

DETAILED DESCRIPTION OF INVENTION

Figure 1:
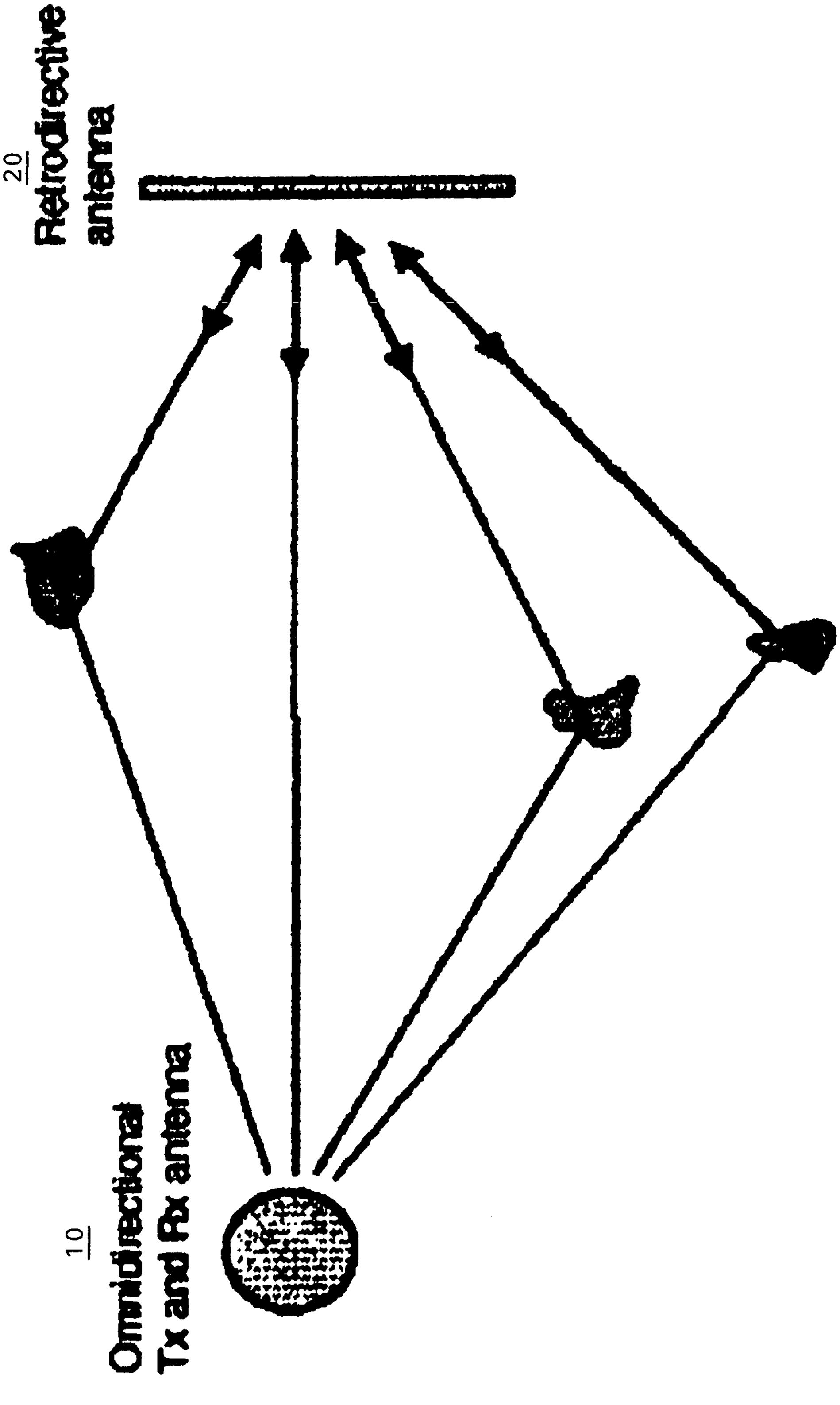
FIG. 1 illustrates a point-to-point communication link employing an omnidirectional antenna and a phase-conjugating retrodirective antenna in a multipath environment in accordance with the present invention.

The use of phase-conjugating retrodirective antenna arrays for returning a signal to or for identifying an interrogating source without the need for any phase shifters or digital signal processing is well-known, as referenced for example in the overview by R. Y. Miyamoto and T. Itoh, "Retrodirective arrays for wireless communications," *IEEE Microwave Magazine*, pp. 71-79, March 2002. Such retrodirective antennas can be used for secure point-to-point communications, multi-user communications schemes, or multi-transponder (satellite) networks, for example, as described in commonly-owned U.S. patent application Ser. No. 10/911,928, filed Aug. 4, 2004, entitled "Microwave Self-Phasing Antenna Arrays, for Secure Data Transmission and Satellite Network Crosslinks", which is incorporated by reference herein.

Previous work involving communications use of phase-conjugating antennas have emphasized automated beam pointing or self-steering in an environment with or without disturbing objects. See, e.g., Y. Chang, H. R. Fetterman, I. L.

Newberg, and S. K. Panaretos, "Microwave phase conjugation using antenna arrays," IEEE Trans. Microwave Theory Tech., vol. 46, no. 11, pp. 1910-1919, November 1998; S. L. Karcde and V. F. Fusco, "Self-tracking duplex communication link using planar retrodirective antennas," IEEE Trans. Antennas and Propagation, vol. 47, no. 6, pp. 993-1000, June 1999; and L. D. DiDomenico and G. M. Reheiz, "Digital communications using self-phased arrays," IEEE Trans. Microwave Theory Tech., vol. 49, no. 4, pp. 677-684, April 2001. In S. L. Karode and V. F. Fusco, "Use of an active retrodirective antenna as a multipath sensor," IEEE Microwave and Guided Wave Letters., vol. 7, no. 12, pp. 399-401, December 1991, a retrodirective antenna was demonstrated for use as a multipath sensor, but not for communications. The use of multipath propagation for communications using audio waves has been demonstrated, for example, in M. Fink, "Time-reversed acoustics," Scientific American, pp. 91-97, November 1999, although an effective communications method employing the technique with radio-frequency waves or microwaves has not been heretofore proposed.

In a typical point-to-multipoint communication link, an omnidirectional base station transmits its signal in all directions. If the communication channel contains obstructions, disturbances, and other signal scatterers, a mobile receiving station may encounter fading due to the resulting multipath effects. Similarly, multipath propagation would affect communication from the mobile station back to the omnidirectional base station.

In the present invention, the ability of a retrodirective antenna to send a return signal back along the same path as received from a source is used to solve the problem of signal scattering or fading due to multipath propagation caused by obstacles or disturbing objects in the signal path. In the invention method, a retrodirective antenna returns a communication transmission signal composed of multiple signal components each directed along a respective one of the multiple pathways taken by an interrogating signal back to an omnidirectional antenna. The multipath propagation through the transmission environment is thus used as a positive, rather than negative, contribution to the communication channel. In the ideal case, the fading can be completely avoided and the return of a communication signal through signal components directed along the pathways of multipath propagation are received additively to improve the effectiveness of the radio channel.

As shown in FIG. 1, the communication method of the present invention can be employed in a communication link between an omnidirectional transmitting/receiving antenna 10 a phase-conjugating retrodirective antenna 20 at the other end of the transmission link across an environment subject to multipath disturbances (indicated by the objects shown between the antennas). The omnidirectional antenna may be employed at a fixed base station, and the phase-conjugating retrodirective antenna 20 may be employed on a mobile communication station. The retrodirective antenna 20 ideally is infinitely directive, i.e., it can send a ray or a narrow beam in any direction conjugated to the direction of an incoming signal. In response to an interrogating signal sent from the omnidirectional antenna and scattered along multiple paths in the multipath environment, the return signal from the retrodirective antenna, which could be modulated, consists of multiple phase-conjugated ray components each directed along a respective one of the multiple pathways taken by the interrogating signal. The multiple ray components reach the omnidirectional antenna additively so as to produce an effective communication reception signal. In this way, retrodirectivity is used to completely eliminate the fading effects of multipath propagation in the communication link.

Retrodirective multipath propagation may actually be used to increase the reliability of the communication link since it is unlikely that all of the available paths between transmitter and receiver can be blocked simultaneously. Furthermore, since the retrodirective antenna can change its radiation pattern in real time, the scheme will still work even if there is relative motion between the receiver and the transmitter.

For simplex communication, the omnidirectional antenna sends an interrogating signal, and the retrodirective antenna sends a reflected signal modulated with the communication signal in a mixing process along the pathways of arrival of the incoming signal back to the omnidirectional antenna. For full-duplex communication, both a retrodirective antenna and a wide beam antenna are needed at both ends of the link.

Figure 2A:
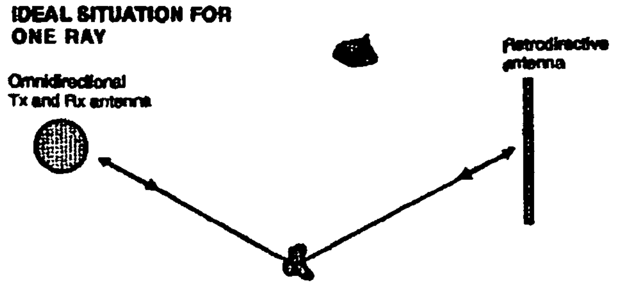
FIGS. 2A and 2B illustrate a comparison of ideal and practical situations for the multipath propagation communication method of the invention.
Figure 2B:
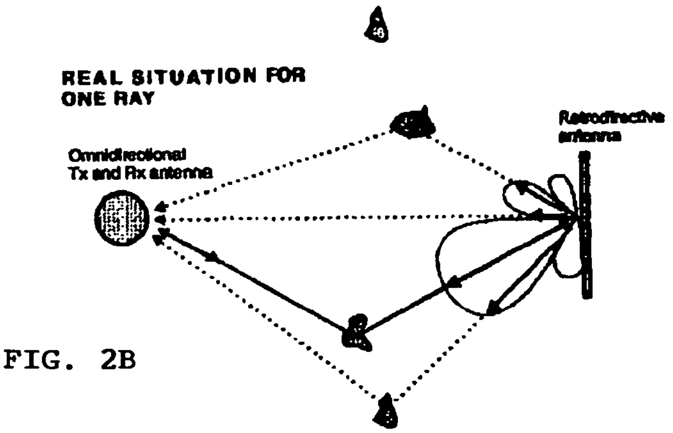

A comparison of the ideal and practical situations for this multipath propagation communication method is illustrated schematically in FIGS. 2A and 2B. In the ideal situation illustrated in FIG. 2A, the retrodirective antenna of unlimited size can send each return signal component as a precise narrow beam retracing the path of propagation. For the practical case of finite antenna size illustrated in FIG. 2B, the retrodirective antenna has a nonzero beam width and sidelobes. Hence, beams reflected back from the practical retrodirective antenna not only return through the main beam path, but also through the side lobes. All of the signals corresponding to the main beam rays add up coherently, whereas all the rays created by the sidelobes have random phases and add up incoherently at the omnidirectional antenna. This limits the method in systems that have practical size or power limits. However, even in limited situations, significant reductions in deep fading and overall signal-level variations can still be obtained for useful results. The utility of the system increases as the directivity of the phase-conjugate array increases and sidelobe level decreases.

Figure 3:
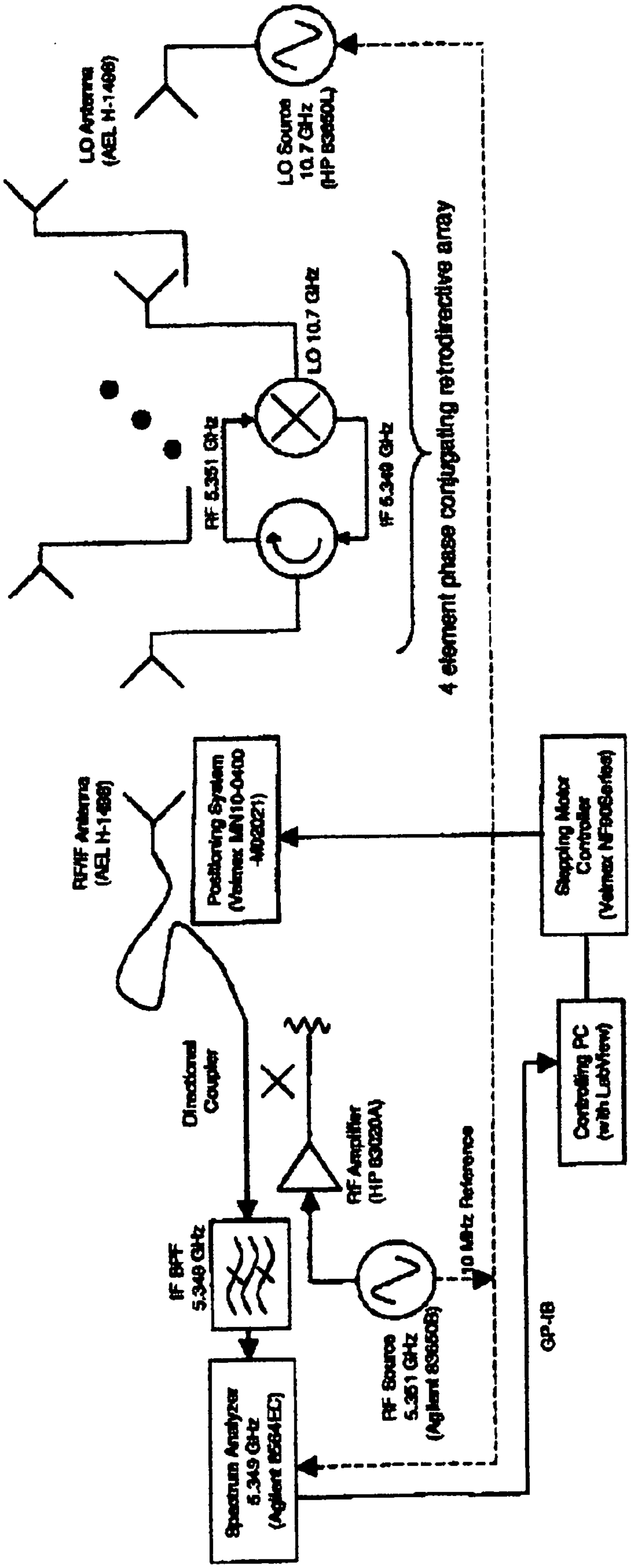
FIG. 3 is a schematic circuit diagram of an experimental set-up for testing the multipath propagation communication method.

To test the invention method, an experiment for transmission at 5.35 GHz was set up as shown in the schematic circuit diagram of FIG. 3. A signal from a synthesizer is fed through a directional coupler to a horn antenna mounted on a computer-controlled x-z stage, allowing two-dimensional movement in the horizontal plane. The horn antenna is placed 1.26 m away from the retrodirective antenna and is able to move 0.74 m in the perpendicular x-direction, as shown in the physical layout (side view) of FIG. 4. The multipath scatterer was a metal reflector providing a reflection path to the target. A local oscillator (LO) signal of 10.7 GHz is supplied from the synthesizer as the interrogating signal to the retrodirective antenna using a quasi-optical feed system. An LO frequency with a small offset from exactly twice the incoming signal is used so that the return signal is slightly different from the 5.351-GHz signal originally transmitted from the horn antenna.

Figure 5:
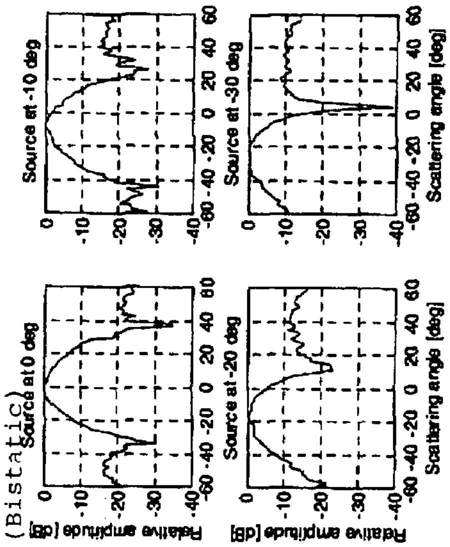
FIG. 5 shows the bistatic patterns of a phase-conjugating retrodirective antenna formed of a four-element patch array used in the test set-up.
Figure 6:
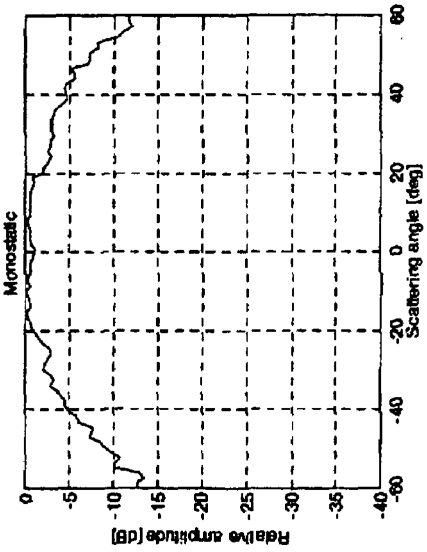
FIG. 6 shows the monostatic patterns of the phase-conjugating retrodirective antenna used in the test set-up.

The phase-conjugating retrodirective antenna in the test set-up was a four-element patch array with FET-based mixers, with bistatic and monostatic patterns shown in FIGS. 5 and 6, respectively. The measured far-field bistatic radiation patterns of the retrodirective antenna at 5.35 GHz were taken when the RF source signal is incident at 0, 10, 20, and 30 degrees. The measured monostatic response of the retrodirective antenna was also taken at 5.35 GHz. A mixing product with conjugated phase is reradiated by this antenna at 5.349 GHz. The returned signal at the horn is detected using a spectrum analyzer attached to the directional coupler.

Figure 4:
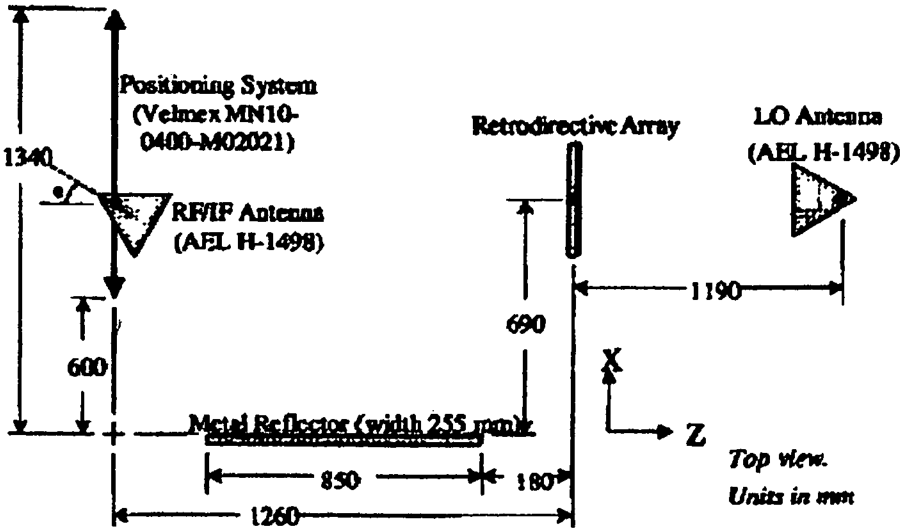
FIG. 4 shows a physical layout (side view) for the experimental set-up.
Figure 7:
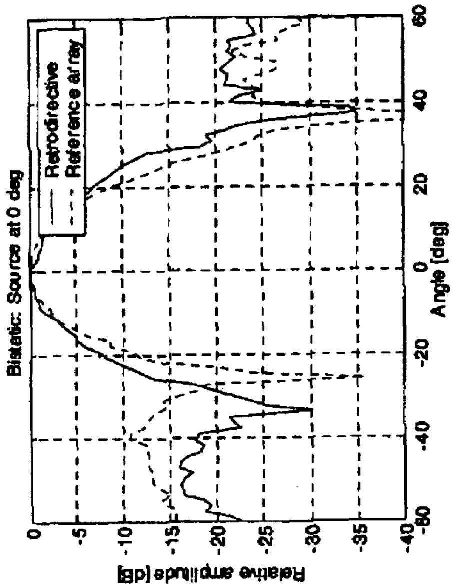
FIG. 7 shows a comparison of the bistatic patterns of a reference (passive four-element patch antenna) array with the retrodirective antenna array used in the test set-up.
Figure 8:
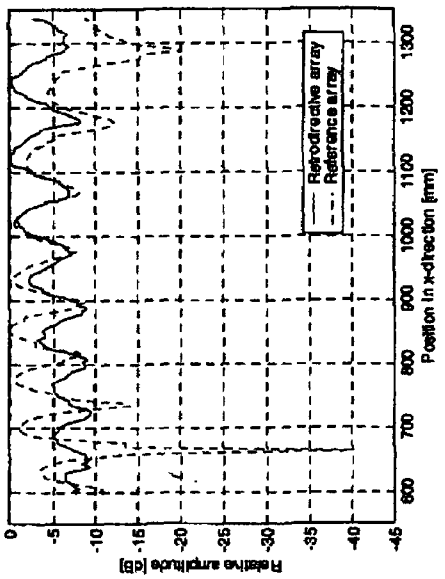
FIG. 8 shows a comparison of the received signal for the reference array and the retrodirective antenna array used in the test set-up.

As a baseline comparison, a passive four-element patch antenna array with a Wilkinson power-divider feed was used in place of the retrodirective antenna. The far-field radiation patterns of the two arrays (reference array in dashed line, retrodirective array in continuous line) are shown in FIG. 7. The measurements were carried in a standard laboratory with absorber positioned in critical areas. To create a severe multipath situation, a reflective object (a metal plate) was placed in the vicinity of the antennas, as shown in FIG. 4. The horn antenna on the moving stage was pointed so that the direct signal and reflected (multipath) signal were comparable in amplitude. Using this same horn antenna setting and while moving it 0.74 m, the signal level was recorded for two cases: (1) the passive reference array used as a transmitting antenna; and (2) the phase-conjugate antenna used to reflect the signal back. A comparison of the recorded signal levels is shown in FIG. 8. The power level variation of the received signal was measured using the phase conjugate retrodirective antenna and the reference array antenna at 5.35 GHz. The probe antenna is pointing towards the reflector in an angle of 50 degrees. For the reference array (dashed line), the signal level varies strongly over a 40-dB range and also includes a deep dip indicating a fading point in the scan. In contrast, for the phase-conjugate antenna (continuous line), the signal level varies by only 9 dB with no deep dips. The retrodirective antenna thus demonstrated a 31-dB improvement in signal-level variation compared to that of a passive reference antenna. This measurement shows that the multipath propagation communication method can actually be used for advantage and can provide an effective transmission signal in a multipath environment.

In summary, the multipath propagation communication method can reduce the effects of fading and signal level variation in a severe multipath environment. The method is based on the use of a phase-conjugating retrodirective antenna advantageously to increase the reliability of the communication link due to its transmission of returning signals along the pathways of multipath propagation and being received additively at the receiver. The principal of operation was demonstrated using a four-element phase conjugating array at 5.35 GHz. In the experiment, severe multipath propagation was simulated with a metal reflector. The retrodirective antenna demonstrated a 31-dB improvement in signal-level variation compared to that of a passive reference antenna.

It is understood that many modifications and variations may be devised given the above description of the principles of the invention. It is intended that all such modifications and variations be considered as within the spirit and scope of this invention, as defined in the following claims.

The invention claimed is:

1. A method of employing multipath propagation in wireless radio communications comprising the steps of:

using an omnidirectional transmitting/receiving antenna at one end of a transmission link to send an interrogating signal across an environment subject to multipath disturbances to a phase-conjugating retrodirective antenna at the other end of the transmission link; and operating the phase-conjugating retrodirective antenna in a cooperative transmission mode by returning a communication signal along the multiple pathways taken by the interrogating signal to be received by the omnidirectional antenna across the transmission environment despite the multipath disturbances.

2. A multipath propagation communication method according to claim 1, wherein, in a simplex communication mode, the omnidirectional antenna provides an interrogating signal which is transmitted in multipath propagation over multiple pathways through the transmission environment to the retrodirective antenna, and the retrodirective antenna sends a return signal mixed with a communication signal that is transmitted with multiple signal components directed along respective ones of the multiple pathways taken by the interrogating signal to be received by the omnidirectional antenna.

3. A multipath propagation communication method according to claim 2, wherein, in a duplex communication mode, both an omnidirectional antenna and a phase-conjugating retrodirective antenna are operated in tandem at each end of the transmission link to provide effective two-way wireless radio transmissions through the transmission environment despite any multipath disturbances.

4. A communication system for multipath propagation in wireless radio communications comprising:

an omnidirectional transmitting/receiving antenna at one end of a transmission link for sending an interrogating signal across an environment subject to multipath disturbances;

a phase-conjugating retrodirective antenna at the other end of the transmission link for receiving the interrogating signal along multiple pathways and for returning a communication signal along the multiple pathways taken by the interrogating signal to be received by the omnidirectional antenna across the transmission environment despite the multipath disturbances.

5. A communication system according to claim 4, wherein, in a simplex communication mode, the omnidirectional antenna provides an interrogating signal which is transmitted in multipath propagation over multiple pathways through the transmission environment to the retrodirective antenna, and the retrodirective antenna sends a return signal mixed with a communication signal that is transmitted with multiple signal components directed along respective ones of the multiple pathways taken by the interrogating signal to be received by the omnidirectional antenna.

6. A communication system according to claim 5, wherein, in a duplex communication mode, both an omnidirectional antenna and a phase-conjugating retrodirective antenna are provided at each end of the transmission link and operated in tandem to provide effective two-way wireless radio transmissions through the transmission environment despite any multipath disturbances.

* * * * *